Patented July 7, 1953

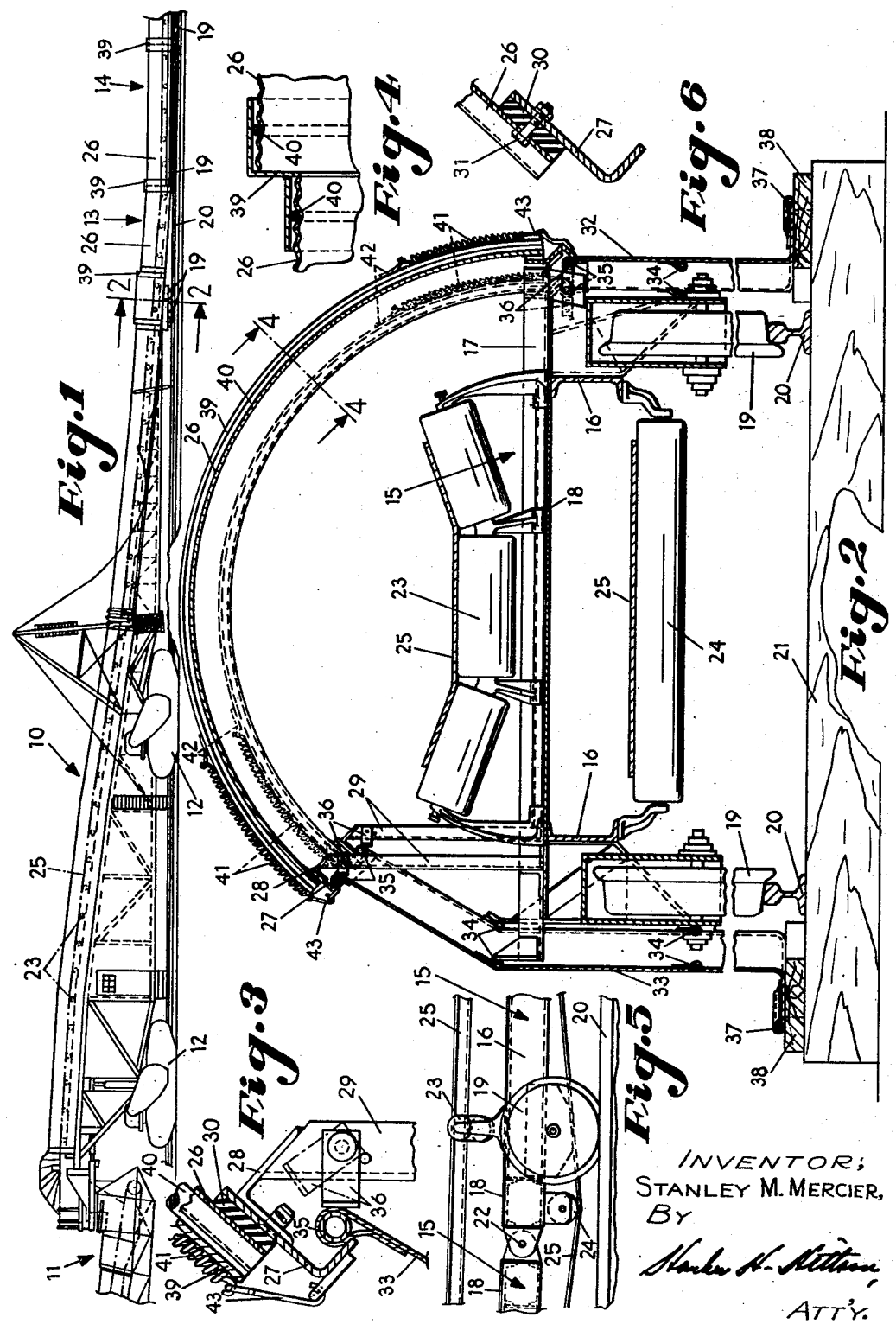

2,644,572

UNITED STATES PATENT OFFICE 2,644,572

COVER MEANS FOR BELT CONVEYERS

Stanley M. Mercier, Bexley, Ohio, assignor to The Jeffrey Manufacturing Company, a corporation of Ohio Application April 22, 1950, Serial No. 157,498

11 Claims. (Cl. 198—204)

This invention relates to a belt conveyer and an object of the invention is to provide improved cover means, part of which is preferably made of corrugated metal, or the like, and an additional part of which is made of canvas, or the like, the cover being constructed to permit ready access to the conveyer.

A further object of the invention is to provide an elongated generally horizontally extending conveyer, preferably mounted for rectilinear movement, the conveyer having an articulated frame which carries an articulated cover for the conveyer.

Other objects of the invention will appear hereinafter, the novel features and combinations being set forth in the appended claims.

In the accompanying drawings:

Fig. 1 is a side elevational view of the head section and a portion of the trailing section of an elongated, articulated, generally horizontally extending belt conveyer incorporating features of my invention.

Fig. 2 is a transverse sectional, elevational view taken on the line 2—2 of Fig. 1, looking in the direction of the arrows.

Fig. 3 is an enlarged elevational view, with parts in section, showing details of the conveyer covering.

Fig. 4 is a sectional view taken on the line 4—4 of Fig. 2, looking in the direction of the arrows.

Fig. 5 is a side view showing particularly a portion of the conveyer including the means for pivotally attaching adjacent articulated sections of the conveyer frame; and Fig. 6 is an enlarged sectional view showing particularly the means for attaching a corrugated metal cover to the conveyer frame.

The apparatus herein disclosed constitutes one feature of the conveyer system various portions of which are shown in my prior applications Serial Nos. 145,501; 145,502, now abandoned; 145,503; 145,504, all filed on February 21, 1950.

A portion of the general conveyer system is illustrated in Fig. 1 of the drawings, comprising particularly the head section 10 of an elongated, articulated, rectilinearly movable belt conveyer system. Said head section 10 discharges materials into a laterally swingable discharge boom, a portion of which is seen at 11. The head section 10 is mounted for rectilinear feeding movement on a plurality of crawlers, two of which are seen at 12, 12. Pivotally attached to the main frame of the head section 10 is a plurality of successive trailing conveyer frame sections of which two successive sections are illustrated at 13 and 14. The trailing sections 13 and 14 as well as the successive trailing sections similar to section 14, of which there may be many, including individual conveyer frames 15 formed by a pair of longitudinally extending spaced channels 16 interconnected by transversely extending members, such as spaced angles 17 and cover plate 18.

Each of the frames 15 of sections 14 is preferably provided with a pair of supporting wheels 19 adjacent one end, which are adapted to ride upon the rails 20 supported upon cross ties 21. Frame 15 of section 13 has six wheels 19 on a supporting truck at one end. One end of each frame 15 is in turn supported by the adjacent section similar to section 14. The frames 15 of successive sections 14 are pivotally connected by clevis means 22 which provides for limited pivotal movement between successive frames 15 on both upright and transverse horizontal axes thus allowing the elongated trailing conveyer to accommodate itself to unevenness in the rails 20.

Each of the trailing sections 14, as well as the trailing sections 13 and the head section 10, has a plurality of troughing idlers 23 and return idlers 24 which support an endless material carrying conveyer belt 25 which extends from a head pulley, at the head or discharge end of the head section 10, to a tail pulley on the rearmost end section 14.

The conveyer 15—25 is preferably covered through substantially its entire length to protect it and the material which it carries from the elements, such as wind, rain, snow and the like.

The structure of the cover for the trailing sections 13 and the manner of its association with the cover of the adjoining portion of the head section 10 is now disclosed in detail, it being understood that except for certain mentioned or obvious differences the same general arrangement applies to the succeeding trailing sections 14 and their association with each other.

Extending from a horizontal position at one side of the conveyer 15—25 substantially at the edge of the transverse angles 17 there is an elongated generally arcuate hood or cover 26 made of corrugated metal, or the like, which extends through an arc in excess of 90° but somewhat less than 180°, which is clearly illustrated in Fig. 2 of the drawings, and preferably overlaps the conveyer 15—25 on each side so that upright planes at the opposite longitudinally extending edges of the cover 26 would fall laterally outside said conveyer 15—25. The hood or cover 26 is rigidly attached to and supported from the main frame 15 by being bolted to a longitudinally extending frame member which, for example, may be carried by such means as the angle 17. The other edge of the hood 26 is similarly bolted to a longitudinally extending angle member 27 (see Figs. 3 and 6) which is carried on spaced angle clips 28 carried by spaced upright angle frame members 29. A rubber filler strip 30 is interposed between the corrugated cover 26 and the angle 27 to provide a weather-tight connection therebetween. A similar filler strip is interposed between the other edge of the cover 26 and the longitudinally extending frame member, to which it is bolted or otherwise attached. As illustrated in Fig. 6 of the drawings, attaching bolts 31 connect the cover 26 and the angle 27 and hold the filler strip 30 in place.

As clearly illustrated in Fig. 2, the left hand edge of the hood or cover 26 terminates in a plane appreciably above the conveyer 15—25. The opposite or right hand edge of the cover 26 terminates laterally of the conveyer 15—25 at a position below the upper run of the belt 25 and above the lower run thereof.

The right hand side of the cover for the conveyer 15—25 within the sections 13 or 14, as the case may be, is provided with a flexible canvas screen or skirt 32. Adjacent the left hand side the cover is formed by a flexible canvas screen or skirt 33, which is generally similar to the skirt 32 but extends a little higher as it must to reach the free lateral edge of the corrugated cover 26.

The canvas screen cover of skirt 33 may, if desired, extend over more than one of the trailing sections 14. It is weighted by having longitudinally extending pipe sections 34, or the like, sewed into loops attached to the canvas skirt and run generally horizontally and longitudinally. Pipe sections 35 extend along the top edge of the canvas 33 and cooperate with the angles 27 and pivoted clips 36 to hold the upper edge of the canvas 33 removably in closing relation with the cover 26.

The canvas 33 has a rope 37, or other light weight device, sewed along its longitudinally extending bottom edge, said bottom edge preferably being formed to slide over a sealing board 38, there being such a sealing board adjacent each rail 20 carried on the cross ties 21. Dirt, or other filler, preferably is filled in between the cross ties 21 up to the sealing boards 38. The canvas 32 is generally similar in construction to the canvas 33 and has its upper edge removably attached to the conveyer frame by clips similar to the clips 36.

It is evident that the canvas or flexible portion of the complete cover of each section 13 and 14 is readily removable, the canvas covering 32 providing access to the conveyer 15—25 principally below the plate 18 while the higher extending canvas 33 provides ready access with the opposite side of the conveyer both above and below the plate 18 or, in other words, to both the upper and lower runs of the belt 25 and to both the troughing idlers 23 and the return idlers 24.

It is, of course, obvious that the entire trailing conveyer, including the head section 10 and all of the successive articulated sections 13 and 14, move rectilinearly along the rails 20. During this movement the weighted bottom portions of the canvas screens or skirts 32 and 33 readily slide along the sealing boards 38 preserving a weather proof sealing contact therewith.

As above set forth, articulated movement between succeeding sections of the complete conveyer is provided by the articulation of the frames 15 and the clevises 22 or equivalent pivotal connecting means therebetween.

Since a rigid corrugated cover 26 is rigidly attached to each main frame 15, or the main frame of the head section 10, it is necessary to provide for limited relative movement between these adjacent rigid covers. In the drawings we have illustrated particularly the interconnection between two corrugated cover members 26 where the section 13 attaches to the head section 10, at which point there is an enlargement of the radius of one of the covers 26. In the subsequent instances where two covers 26 of adjacent sections 14 approach each other the corrugated cover means 26 will be segments of the same radius. However, the fundamental method of providing the continuity of the cover through the articulated cover zone is the same in any case.

As illustrated particularly in Fig. 4 of the drawings, the continuity of the cover with the weighted bottom adjacent cover section 26 is provided by an arcuate cover band member 39 which extends longitudinally over the adjacent ends of the corrugated cover sections 26. The arcuate dimensions of the cover band member 39 are contiguous with the arcuate dimensions of the corrugated cover 26. Each adjacent end of corrugated cover 26 has a flexible spacer 40, preferably carried in one of the corrugation troughs and adapted to receive the cover band 39. The flexible spacer 40 may be made of rope, rubber or the like. It provides an effective seal between the band 39 and the cooperating corrugated cover 26 while permitting articulated movement between adjacent covers 26 on both transverse, horizontal and upright axes. The band cover members 39 are removably held in place by coil springs 41 adjacent opposite longitudinal extending edges, one end of each coil spring 41 being attached by clip means 42 to the cover member 26, the other end being attached by clip means 43 to a portion of the main frame 15, such as the angle member 27 (see Fig. 3), or a similar or other angle member at the opposite side of said cover member 26.

From the above description it is obvious that the generally horizontal elongated articulated conveyer may be moved rectilinearly, the elongated articulated construction accommodating unevenness in the path upon which said conveyer is supported. The conveyer is substantially entirely covered by a combination rigid and flexible cover means which provides for articulation of the covers and also provides for ready access to the conveyer substantially any place along its length. The rigid cover provided by the corrugated metal 26 of each section, such as a section 13 or 14, extends over the conveyer as represented by the idlers 23 and 24 and the belt 25 so as to be continuous from one side thereof to the other. Thus, if any canvas skirt 32 or 33 were inadvertently removed the belt 25 and the material thereon would still receive a high degree of protection.

Obviously those skilled in the art may make various changes in the details and arrangement of parts without departing from the spirit and scope of the invention as defined by the claims hereto appended, and applicant therefore wishes not to be restricted to the precise construction herein disclosed.

Having thus described and shown an embodiment of the invention, what it is desired to secure by Letters Patent of the United States is:

1. A conveyer including a longitudinally extending frame, means mounting said frame for rectilinear traveling movement, a conveyer supported by said frame, means for covering said conveyer including a hood having a metal portion extending partially thereover and ending in a lateral edge above said conveyer, and a flexible canvas extension for said metal portion adjacent at least one side of said conveyer, said hood covering the top and both sides of said conveyer.

2. A conveyer including a longitudinally extending frame, a conveyer supported by said frame, means for covering said conveyer including a hood having a metal portion extending partially thereover and ending in a lateral edge above said conveyer, and a flexible non-metallic extension for said metal portion adjacent at least one side of said conveyer, said hood covering the top and both sides of said conveyer.

3. A conveyer including a longitudinally extending frame, a conveyer supported by said frame, means for covering said conveyer including a hood having a metal portion extending partially thereover and ending in a lateral edge above said conveyer, and a flexible non-metallic extension for said metal portion adjacent at least one side of said conveyer.

4. A conveyer including a longitudinally extending frame, means mounting said frame for rectilinear traveling movement, a conveyer supported by said frame, means for covering said conveyer including a hood having a metal portion extending partially thereover, and a flexible extension for said metal portion adjacent at least one side of said conveyer, said hood covering the top and both sides of said conveyer, said flexible extension having hold-down weights attached thereto.

5. A conveyer including a longitudinally extending frame, means mounting said frame for rectilinear traveling movement, a conveyer supported by said frame, means for covering said conveyer including a hood having a metal portion extending partially thereover, a flexible extension for said metal portion adjacent at least one side of said conveyer, said hood covering the top and both sides of said conveyer, and clip means for removably attaching the top of said flexible extension to said metal portion.

6. A conveyer including a longitudinally extending frame, a conveyer supported by said frame, means for covering said conveyer including a hood having a metal portion extending partially thereover, a flexible extension for said metal portion adjacent at least one side of said conveyer, said hood covering the top and both sides of said conveyer, and clip means for removably attaching the top of said flexible extension to said metal portion.

7. A conveyer system including an elongated generally horizontally extending frame, wheels supporting said frame for travel along rails, a conveyer on said frame, and a combination rigid and flexible cover for said frame and conveyer supported by said frame including flexible members extending downwardly to positions adjacent said rails and adapted to slide along adjacent said rails when said frame travels.

8. A conveyer system including an elongated generally horizontally extending frame, wheels supporting said frame for travel along rails, a conveyer on said frame, and a combination rigid and flexible cover for said frame and conveyer, including flexible members extending downwardly to positions adjacent said rails and adapted to slide along adjacent said rails when said frame travels.

9. A conveyer system including an elongated generally horizontally extending frame, wheels supporting said frame for travel along rails, a conveyer on said frame, a combination rigid and flexible cover for said frame and conveyer including flexible members adapted to slide along beside the supporting rails for said wheels when said frame travels, and spring and clip means removably holding at least part of said rigid cover means in place.

10. A conveyer system including elongated generally horizontal articulated frame sections, a conveyer extending over said frame sections, a cover for said conveyer including longitudinally spaced corrugated rigid portions for successive sections, means bridging said successive corrugated cover portions including flexible spacer means in the troughs of successive corrugated cover portions, a stepped rigid portion overlapping said successive corrugated portions and contacting said flexible spacer means, and spring means for clamping said rigid overlapping portion against said flexible spacer means.

11. A conveyer system including elongated generally horizontal articulated frame sections, a conveyer extending over said frame sections, a cover for said conveyer including longitudinally spaced corrugated rigid portions for successive sections, means bridging said successive corrugated cover portions including flexible spacer means in the troughs of successive corrugated cover portions, a rigid portion overlapping said successive corrugated portions and contacting said flexible spacer means, and spring means for clamping said rigid overlapping portion against said flexible spacer means.

STANLEY M. MERCIER.

References Cited in the file of this patent

UNITED STATES PATENTS

| Number | Name | Date |
| --- | --- | --- |
| 1,679,886 | Wright | Aug. 7, 1928 |
| 2,038,471 | Benatar | Apr. 21, 1936 |